US011886953B2

(12) United States Patent
Chakravarty et al.

(10) Patent No.: US 11,886,953 B2
(45) Date of Patent: Jan. 30, 2024

(54) COMPUTER VISION SYSTEM AND METHOD OF LABEL DETECTION, READING, AND REGISTRATION OF LABELS ON OBJECTS

(71) Applicant: Position Imaging, Inc., Portsmouth, NH (US)

(72) Inventors: Narasimhachary Nallana Chakravarty, Rollinsford, NH (US); Guohua Min, Exeter, NH (US); Edward L Hill, Conway, NH (US)

(73) Assignee: Position Imaging, Inc., Portsmouth, NH (US)

( * ) Notice: Subject to any disclaimer, the term of this patent is extended or adjusted under 35 U.S.C. 154(b) by 41 days.

(21) Appl. No.: 17/227,931

(22) Filed: Apr. 12, 2021

(65) Prior Publication Data
US 2021/0319195 A1 Oct. 14, 2021

Related U.S. Application Data

(60) Provisional application No. 63/009,143, filed on Apr. 13, 2020.

(51) Int. Cl.
G06K 7/14 (2006.01)
G06Q 10/087 (2023.01)

(52) U.S. Cl.
CPC ......... *G06K 7/1417* (2013.01); *G06K 7/1413* (2013.01); *G06K 7/1447* (2013.01); *G06Q 10/087* (2013.01)

(58) Field of Classification Search
CPC .. G06Q 10/087; G06K 7/1443; G06K 7/1447; G06K 2007/10504

(Continued)

(56) References Cited

U.S. PATENT DOCUMENTS 10,148,918 B1 12/2018 Seiger et al.
2016/0098831 A1 4/2016 Glickman et al.
(Continued)

FOREIGN PATENT DOCUMENTS

WO 2017120660 A1 7/2017

OTHER PUBLICATIONS

International Search Report and Written Opinion on PCT/US21/26832 dated Jun. 29, 2021.
(Continued)

*Primary Examiner* — Suezu Ellis
(74) *Attorney, Agent, or Firm* — Schmeiser, Olsen & Watts LLP; Timothy P. Collins

(57) ABSTRACT

A computer vision system for automatic identification, tracking and management of inventory and/or assets, wherein: the computer vision system is programmed with predetermined and configurable image data conditions that identify and capture certain types of movement; the computer vision system is programmed to constantly capture and process image data from one or more sets of sensors to detect the image data conditions; the computer vision system is programmed to trigger the process of identifying all objects and extracting label information from objects present in a field of view of the system if the image data conditions are fulfilled; the computer vision system processes the image data with one or more object detection algorithms and label detection algorithms and generate correspondences between objects and labels identified; and the computer vision system running change detection algorithms and semantic analysis to detect if any object was moved, removed, occluded and if any new objects were added in to the system.

15 Claims, 8 Drawing Sheets

(58) Field of Classification Search
USPC .............................................. 235/385; 705/28
See application file for complete search history.

(56) References Cited

U.S. PATENT DOCUMENTS

| | | | |
|---|---|---|---|
| 2016/0217417 A1 | 7/2016 | Ma et al. | |
| 2018/0164103 A1 | 6/2018 | Hill | |
| 2018/0357601 A1 | 12/2018 | Jacobus et al. | |
| 2019/0087772 A1* | 3/2019 | Medina | B25J 9/1697 |
| 2019/0303850 A1 | 10/2019 | Mangos et al. | |
| 2019/0347611 A1* | 11/2019 | Fisher | G06V 20/52 |
| 2020/0097724 A1 | 3/2020 | Chakravarty et al. | |
| 2021/0012272 A1* | 1/2021 | Dugar | G06T 7/0008 |

OTHER PUBLICATIONS

Hill, et al. "Package Tracking Systems and Methods" U.S. Appl. No. 15/091,180 filed Apr. 5, 2016.

International Preliminary Report on Patentability in International Application No. PCT/US2021/026832 dated Oct. 27, 2022.

* cited by examiner

COMPUTER VISION SYSTEM AND METHOD OF LABEL DETECTION, READING, AND REGISTRATION OF LABELS ON OBJECTS

CROSS-REFERENCE TO RELATED APPLICATION

This application claims priority to U.S. provisional application No. 63/009,143, filed Apr. 13, 2020 and entitled System and Method of Label Detection, Reading, and Registration of Labels on Objects," the entirety of which is incorporated by reference herein.

SUMMARY

Described herein are a computer-vision-based system and method for automatically detecting and reading labels and barcodes on objects as, or shortly after, such objects are placed on a support surface, such as a shelf, and registering the labels with the locations of their associated objects. In brief overview, the system and method capture images of an area designated for holding objects such as packages. Image processing of the captured images detects objects in the image, and machine learning technology identifies the objects in the image. Machine-learning-based techniques for identifying objects are described in U.S. App. Pub. No. US 2020-0097724-A1, published Mar. 26, 2020, titled "Machine-Learning-Assisted Self-Improving Object-Identification System and Method," the entirety of which application is incorporated by reference herein. Each detected object is registered with its location (i.e., position) in the area.

In one aspect, provided is a computer vision system for automatic identification, tracking and management of inventory and/or assets, wherein: the computer vision system is programmed with predetermined and configurable image data conditions that identify and capture certain types of movement; the computer vision system is programmed to constantly capture and process image data from one or more sets of sensors to detect the image data conditions; the computer vision system is programmed to trigger the process of identifying all objects and extracting label information from objects present in a field of view of the system if the image data conditions are fulfilled; the computer vision system processes the image data with one or more object detection algorithms and label detection algorithms and generate correspondences between objects and labels identified; and the computer vision system running change detection algorithms and semantic analysis to detect if any object was moved, removed, occluded and if any new objects were added in to the system.

In another aspect, a method for executing a computer vision system for automatic identification, tracking and management of inventory and/or assets, comprises programming a special-purpose computer with predetermined and configurable image data conditions that identify and capture certain types of movement; programming a special-purpose computer to constantly capture and process image data from one or more sets of sensors to detect the image data conditions; programming a special-purpose computer to trigger the process of identifying all objects and extracting label information from objects present in a field of view of the system if the image data conditions are fulfilled; programming a special-purpose computer to process the image data with one or more object detection algorithms and label detection algorithms and generate correspondences between objects and labels identified; and programming a special-purpose computer to execute change detection algorithms and semantic analysis to detect if any object was moved, removed, occluded and if any new objects were added to the system.

In addition, the system and method described herein detect labels on the objects. As used herein, a label is an identifier for an object. Labels typically have, for example, information readable by optical character recognition (OCR) and/or a barcode. As used herein, OCR encompasses text and numeric recognition and a barcode refers to any type of machine-readable code, whether standardized or custom-made, including but not limited to 1D and 2D barcodes, linear barcodes, QR codes, data matrices, and computer-vision markers, also known as visual or optical fiducial markers. Examples of fiducial markers include but are not limited to ARToolkit, ARTag, ARUCO, BinARyID, binary square, Canon, color codes, Cybercode, HOM, IGD, Intersense, Matrix, ReactTiVision, SCR, and Visual Code markers. While all barcodes are labels, all labels are not barcodes.

Detected labels are then read, and the label information acquired from the labels is registered at the location (position) of the object bearing that label. Because the detecting and reading of labels occurs automatically, for example, in response to triggering mechanisms described herein, the system and method typically avoids the need for human intervention to manually input or scan labelling information. However, in the event of an error, for example, an object has no label or the detected label cannot be read, the system and method can notify an individual to manually input the label information or scan the label on the object. Some embodiments of the system and method can be considered "object-agnostic" and "label-agnostic", in that the system and method do not know beforehand what types of objects will be encountered on the support surface or what types of labels will be on detected objects. Other embodiments know the kind of label to be detected, which helps increase the system's speed and accuracy. For example, the system and method may be customized to detect barcode type 128 (and would not use OCR). As another example, the system and method may be customized to specific tracking barcodes and use OCR for shipping labels.

In some embodiments, a method for automatically reading a label on an object, the method comprises capturing images of a support surface; detecting one or more objects in the captured images; detecting one or more labels in the captured images; automatically reading label information from each detected label; and registering each detected label and the label information read from that detected label with a corresponding object of the one or more detected objects.

In other embodiments, an apparatus comprises one or more of one or more types of cameras capturing images of a support surface; and a controller including one or more processors configured to process the captured images to detect one or more objects, detect one or more labels in the captured images, automatically read label information from each detected label, and register each detected label and the label information read from that detected label with a corresponding object of the one or more detected objects.

In another aspect, a computer vision system for automatic identification, tracking and management of inventory and/or assets, wherein: the computer vision system is programmed with predetermined and configurable image data conditions that identify and capture certain types of movement; the computer vision system is programmed to constantly capture and process image data from one or more sets of sensors to detect the image data conditions; the computer vision system is programmed to trigger the process of identifying all objects and extracting label information from objects present in a field of view of the system if the image data conditions are fulfilled; the computer vision system processes the image data with one or more object detection algorithms and label detection algorithms and generate correspondences between objects and labels identified; and the computer vision system running change detection algorithms and semantic analysis to detect if any object was moved, removed, occluded and if any new objects were added to the system.

In some embodiments, the process being triggered comprises: capturing images of a support surface; detecting one or more objects of the objects in the captured images; detecting one or more labels in the captured images; automatically reading label information from each detected label; and registering each detected label and the label information read from that detected label with a corresponding object of the one or more detected objects, wherein the triggered process is automatically performed by a key or marker in the captured images.

In some embodiments, the image data conditions include a set of rules that for capturing certain types of physical movements.

In some embodiments, the system associates each detected object in the field of view with a location on the support surface.

In some embodiments, the system notifies personnel if a label is not detected or read for any of the one or more detected objects.

In some embodiments, reading label information from a given detected label comprises performing optical character recognition on the detected label.

In some embodiments, system further comprises transforming an image of the detected label to appear in an orientation that facilitates optical character recognition.

In some embodiments, the detected label is a barcode; and reading label information from a given detected label comprises reading the barcode.

In some embodiments, the barcode includes a geometry used to determine a perspective of the camera with assistance of a de-skewing process.

In some embodiments, the system further comprises guiding personnel to a given object on the support surface when a label is not detected on the given object or a label detected on the given object could not be automatically read.

In some embodiments, the system comprises scanning, by personnel using a mobile device, a label on the given object when the label is not detected on the given object or the label is detected on the given object but could not be read automatically.

In some embodiments, the system comprises stabilizing the scanning of the label on the given object with an inertial sensor of the mobile device.

In some embodiments, information obtained from the label is processed to obtain the type of the object, and the system further comprises detecting what the objects are from the object detection results; and provide correspondences or provide an additional verification for making the correspondences.

In some embodiments, the key or marker is one or more of (1) and amount or location of observed changes, (2) changes detected in object locations, new and/or removed objects, (3) changes detected in a location of existing labels or new labels, and (4) a detection of a specific type of person, automaton, or object wherein for new objects, the system further comprises generating a correspondence between the new objects and labels by processing location and type data of the new objects and labels.

In another aspect apparatus comprises one or more of one or more types of cameras capturing images of a support surface; and a controller including one or more processors configured to process the captured images to detect one or more objects, detect one or more labels in the captured images, automatically read label information from each detected label, and register each detected label and the label information read from that detected label with a corresponding object of the one or more detected objects.

In another aspect, a method for executing a computer vision system for automatic identification, tracking and management of inventory and/or assets comprises programming a special-purpose computer with predetermined and configurable image data conditions that identify and capture certain types of movement; programming a special-purpose computer to constantly capture and process image data from one or more sets of sensors to detect the image data conditions; programming a special-purpose computer to trigger the process of identifying all objects and extracting label information from objects present in a field of view of the system if the image data conditions are fulfilled; programming a special-purpose computer to process the image data with one or more object detection algorithms and label detection algorithms and generate correspondences between objects and labels identified; and programming a special-purpose computer to execute change detection algorithms and semantic analysis to detect if any object was moved, removed, occluded and if any new objects were added to the system.

DETAILED DESCRIPTION

Figure 1:
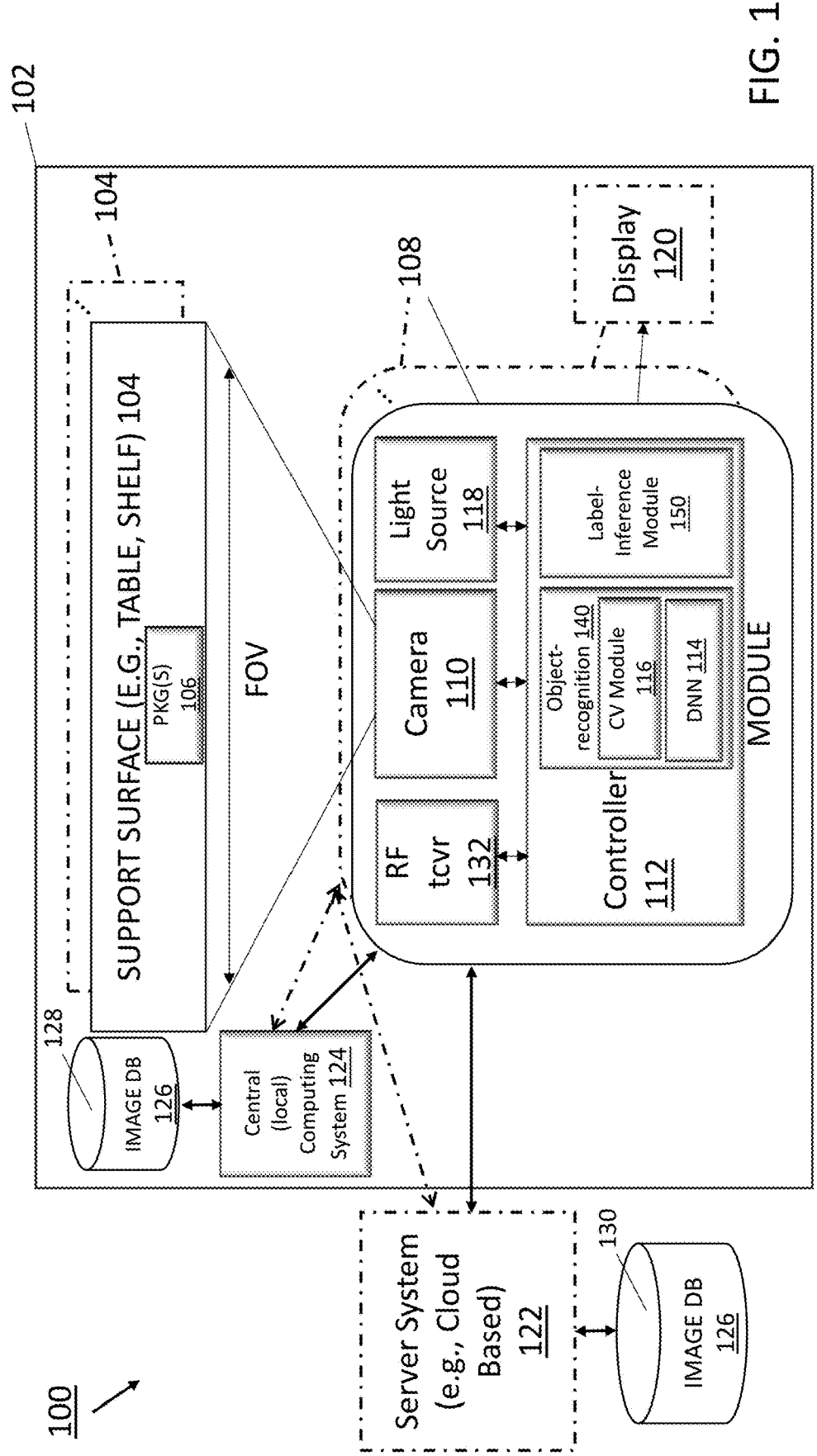
FIG. 1 shows one embodiment of a system deployed in an object-tracking area.

FIG. 1 shows one embodiment of a system 100 deployed in an object-tracking area 102 (also referred to as an object-holding area, fixed site, or controlled environment). In some embodiments, the system is, is part of, or is referred to as a computer vision system. The tracking area 102 can be, for example, in a store, supermarket, warehouse, business enterprise, inventory, room, closet, hallway, cupboards, lockers, the cargo bay of a delivery truck or water-going vessel, each with or without secured access. The tracking area 102 includes an object-supporting surface 104. Examples of the object-supporting surface 104 include, but are not limited to, desktops. tables, shelves, and floor space. In brief, the system 100 identifies and tracks objects placed on and removed from the object-supporting surface 104, and detects, reads, and registers labels on those objects. Examples of identified and tracked objects include, but are not limited to, packages, parcels, boxes, equipment, tools, food products, bottles, jars, and cans. (People may also be identified and tracked.) For illustrative purposes, the object-supporting surface 104 includes a plurality of shelves, and on the shelves are packages, items, objects, and/or assets 106 (generally, package 106).

The system 100 includes one or more computer-vision-based object tracking apparatuses (hereafter, module) 108. Each module 108 includes at least one (e.g., RGB, depth sensor, infrared) camera 110 in communication with a controller 112. Advantageously, the combined fields of view (FOV) of multiple cameras can ensure most, if not all, angles of an object and, thus, of a label on that object, can be seen. The controller 112 includes an object-recognition module 140 and a label-inference module 150. In an embodiment with multiple sets of sensors, the controller uses one set of sensors for object detection and another set of sensors for label detection. Each set of sensors comprises one or more cameras 110, a set of sensors being described as those one or more cameras dedicated to capturing images for one of the two operations of object detection and label detection. The sets of sensors are calibrated before system operation so that a pixel-to-pixel correspondence can be made from one set of sensors to the other set of sensors. In an embodiment with only one set of sensors, the controller uses the images captured by that set to perform both object detection and label detection.

The object-recognition module 140 includes one or more deep neural networks (DNN) 114, for use in identifying objects in images (and, in one embodiment, for use in detecting labels on identified objects) and a computer-vision (CV) module 116 for use in detecting changes in images. In general, the object-recognition module 140 is configured to detect objects in images, to track such objects, and to perform object recognition using the DNN 114. Example implementations and embodiments of the object-recognition module 140 are described in the aforementioned U.S. App. Pub. No. US 2020-0097724-A1.

In general, the label-inference module 150 employs computer vision algorithms and optionally the DNN 114 to find labels on objects, specifically by detecting changes in images and barcodes, labels, and/or OCR areas in the image areas of detected change, and to automatically read information from those labels.

In the instance of multiple DNNs 114, such neural networks can operate in parallel (e.g., one of which attempts to identify an object in the image while another of which attempts to detect a label in the image) or serially. In the instance of multiple DNNs, such networks can operate either in parallel or serially using one or more local and/or remote processing units such as CPUs/GPUs. Each module 108 can optionally include a light source 118 (shown in phantom), one or more depth sensors (not shown), and a wireless radiofrequency (RF) transceiver 132.

Each module 108 can be a self-contained electronic unit capable of registering persons who visit the object-holding area 102, capturing images, performing image processing, detecting objects, performing machine-learning-assisted self-improving label detection and label reading, object tracking, and, when so configured, providing light guidance. In other embodiments, one or more of these functions takes place remotely (i.e., not at the module); for example, the functions of object detection and identification, machine-learning-assisted, self-improving label detection and label reading, and object tracking can occur at a remote computing site with which the module 108 is in communication over a network.

The module 108 may be deployed in a fixed position near the object-supporting surface 104 in the object-holding area 102, or it may be mobile, embodied in a mobile device. As an example of a fixed deployment, the modules 108 may drop down from the ceilings in a surveillance configuration so that all corners of an enterprise site are covered. These modules are small and non-intrusive and can track the identifications and paths of individuals through the enterprise, for example, as described in U.S. Pat. Pub. No. US-2018-0164103-A1, published Jun. 14, 2018, the entirety of which application is incorporated by reference herein.

Mobile embodiments of the module include 108, but are not limited to, a smartphone, tablet computer, wearable computing device, or any other portable computing device configured with one or more processors, an RGB camera, wireless communication capabilities, an optional depth sensor, an optional light source, and software for performing the image processing, object detecting, label detecting, label reading, tracking, and recognizing, and the self-improving machine learning functions described herein. The software can be embodied in a downloaded application (app) that can be stored on the mobile device. The mobile module 108 can further include an inertial sensor (not shown) to provide stabilization for image capture. Being portable, a person or machine can, in effect, carry an object-identification and label-detection-and-reading device capable of recognizing objects captured by the camera(s) of the mobile device and reading the objects' labels. For example, a person with such a device can run the software, approach a table (i.e., the object-support surface) holding various objects, point the device (i.e., its camera(s)) at each object, capture an image of an object, detect and identify the object, detect and read the label on the object, and be told the type (identity) of the object and labeling information associated with the object. To obtain this information, the mobile device may communicate with a remote server that hosts the DNN (and/or other computer-vision tracking algorithms), sending the image to the remote server, and receiving the identity and labeling information of the object.

Each camera 110, which may also be referred to herein as an image or optical sensor, provides color information and is disposed to face the object-supporting surface 104. Each camera 110 has a field of view (FOV) that covers a portion of, or all the area occupied by the object-supporting surface 104. Depending upon the configuration of the system 100, each camera 110 may have a narrow FOV lens or a wide FOV lens, a fixed focus or a variable motorized programmable focus, and a fixed zoom or a motorized programmable zoom. Embodiments with multiple cameras 106 have overlapping fields of view directed at the object-supporting surface 104. The field of view of an optional depth sensor matches at least that of a camera. Each separate camera 110 has its own perspective of the area and of the objects placed on the object-supporting surface 104.

The controller 112 may be configured to control the light source 118 to provide light guidance to objects located on the object-supporting surface 104 or to certain regions of the support surface, depending upon the object or region of interest. Examples of the light source 118 include, but are not limited to, lasers, projectors, LEDs, light bulbs, flashlights, and lights. The light source 118 may be disposed on or remote from and directed at the object-supporting surface 104. Instead of or in addition to using light guidance, the controller 112 can employ other means to guide personnel to objects on the object-supporting surface 104, examples of which include, but are not limited to, audio cues and/or visual displays.

The controller 112 may be in communication with a display 120, which may be included in the system 100, to provide, for example, a visual layout of the objects on the support surface, visual guidance to objects or regions on the surface, and a user interface for use by persons who enter and leave the object-holding area. The display 120 may be conveniently located at the threshold of or within the holding area (e.g., as part of a kiosk). Alternatively, the display 120 may be part of an electronic device (e.g., a computer or a handheld device, such as a smartphone, mobile device, or tablet) configured with input/output devices (e.g., a physical or virtual keyboard, touchscreen, keypad, barcode scanner, microphone, camera) that may be used to register the identities of persons entering the object-holding area, guide personnel to objects on the support surface, and/or to scan object labels.

The controller 112 may also be in communication with one or more servers 122 (i.e., server system) over a network connection. These server(s) 122 may perform third-party services, such as "cloud services," or be implemented locally or onsite at the enterprise. As used herein, the "cloud" refers to software and services that run on a remote network, such as the Internet, instead of at a module 108 or at a local computer 124. The cloud may be public, private, or a combination thereof. An example of cloud services suitable for the principles described herein is Azure™ cloud services provided by Microsoft® of Redmond, WA The server(s) 122 can run a virtual machine that provides the cloud services required by the module 108. The local computer 124 can perform centralized functionality for the modules 108, as described further herein.

During operation of the system 100, persons arrive at the object-holding area 102 to perform any one or more of a variety of object-handling activities, including, but not limited to, depositing one or more objects on the object-supporting surface 104, removing one or more objects from the object-supporting surface 104, moving one or more objects to another location in the holding area, and responding to guidance to an object that warrants inspection (e.g., for finding and reading labels on objects, confirming expiration of an object, confirming identified damage of an object).

In general, the system registers the identities of persons who arrive at the holding area (i.e., who interact with the object-identification system) and associates each registered person with one or more objects that the person is handling. Using image processing techniques, the system continuously monitors and acquires real-time image data of the holding area. From the real-time image data, the system detects when each such object is placed on the object-supporting surface, moved to another region of the support surface, or removed from the support surface. Tracking objects entails registering the objects with locations on the object-supporting surface 104. Techniques for detecting and tracking objects disposed on a support surface in a holding area can be found in U.S. Pat. No. 10,148,918 issued Dec. 4, 2018, titled "Modular Shelving Systems for Package Tracking," and in U.S. patent application Ser. No. 15/091,180, filed Apr. 5, 2016, titled "Package Tracking Systems and Methods," the entirety of which patent application is incorporated by reference herein.

As previously mentioned, some embodiments include image processing techniques that are implemented, e.g., stored and executed by one or more computers of the system, which continuously monitors and acquires real-time image data of the holding area. Some embodiments, in brief overview, include a computer-executed process comprising the steps of determining changes with respect to both object models and labels, and matching the labels with the objects. As defined herein, an object model is a representation of the object in an algorithm. Determining object model changes may include the use of object detection algorithms and comparison of previous results and the current and inferring new objects, removed objects, and moved objects. An object model can include the information described herein, and/or additional information such as (but not limited to) area, size, and shape in image spaces, for example, where there are multiple sensors acquiring images, object type, probability of the object being of the type, and so on. Determining label changes may be performed using label detection algorithms and comparison of previous results and the current and inferring new labels, removed labels, and moved labels. The determination steps may include the use of a computer-vision (CV) module for narrowing a detection search using background change information. The comparison or matching step may make the correspondences by using the pixel area boundaries and additional object information that can be extracted from the label data. In some embodiments, the foregoing steps are triggered automatically when the program observes, detects, or otherwise establishes electronically a pre-set, configurable, and adjustable set of conditions, referred to herein as image data conditions. These conditions are a set of rules that are created with the sole purpose of capturing certain types of physical movements such as person entering/exiting the field of view (FOV) of the system, or an object falling. The program can use either any one rule or it could use any/all combinations with any binary logical operations between each of these individual rules. For example, Rule1 AND Rule2, or Rule1 OR Rule 2, or (Rule1 AND Rule2) OR Rule3, or simply Rule1. Other conditions can be added such as one set of rules need to occur before/after another set of rules, e.g., Rule1 followed by Rule2. This allows the system to capture a more complex set of movements such as person entering the field of view (FOV) of the system followed by person moving objects, followed by person exiting the room.

Each individual rule, for example, Rule 1 or 2 above, is an observation of a keyframe or a marker in the frame. If a marker is detected in a frame, that frame is marked as a keyframe and will satisfy the condition using that keyframe. Examples of markers may include but not be limited to detection of an object of a specific type, ex. "person" or "robot", or lack of detection of an object of a specific type. Other examples, may include but not be limited to observing a new object or label that did not exist in the previous frame, an object or label that is no longer detected, the object or label is not in the same location as it was in the previous frame, a change detected in a frame that cross a preset threshold, no detected change above a threshold, a detected motion in a frame that crossed a preset threshold, and/or no motion detected in a frame that was above at threshold, etc.

One specific example of conditions that are set can be to look for total area/volumetric change above a threshold (KF1) followed by looking for no change above a threshold (KF2). This will first try and find KF1 and then look for KF2. Once they are both found, the program will execute the steps to scan the labels and assign them to objects. This keyframe detection is the highest layer of logic that is performed continuously that triggers the remaining steps after the conditions are met, hence making this a completely automatic process. Therefore, in some embodiments, a marker or some other key image derived from the image permits the system to automatically perform a scan to then read the label using an approach described herein. This process may be executed to continuously monitor for changes using a key, e.g., key image, or marker corresponding to amount and location of changes observed.

The system 100 also recognizes each object on the object-supporting surface 104 or involved in a handling activity. Object recognition serves to identify the type of object detected and tracked (e.g., a package from a certain carrier, a jar of pickles, a microscope). The system does not need to know beforehand the type of objects that will be captured in the images in order to perform object recognition, but such object recognition may involve human interaction to initially identify or to confirm, correct, or fine tune the recognition of a given object. The system employs machine-learning techniques to improve its object-recognition capabilities. Recognition of a given object can facilitate the tracking of the object while the object is in the holding area, serving to confirm the presence or movement of the object.

In an embodiment that does not use computer vision to initially identify an object, each object has an RFID tag with which the module 108 (mobile or stationary) wirelessly (i.e., RF) communicates in order to identify that object and establish the initial position of that object on the object-supporting surface. Afterwards, the system 100 uses computer-vision techniques to track movement of the object (removal or moved to another location of the monitored area).

Another alternative to using computer vision is barcode detection using laser scanners or the like. In this embodiment, each object has a barcode, which is detected and used to identify the object using a laser-based handheld device or a fixed-mount barcode scanning device. Afterwards, the system 100 uses computer-vision techniques to establish the initial position of that object on the object-supporting surface and to track movement of the object (removal or moved to another location of the monitored area).

In addition, the system 100 attempts to detect a label on each object on the object-supporting surface. Label detection is prerequisite to reading label information associated with the detected object. Two different techniques may be used to detect a label on a detected object: one technique uses a DNN, another uses more traditional computer vision techniques. After detecting a label on the object, the system attempts to read label information from the detected label. The system registers (i.e., associates, assigns) successfully read label information with the object (and the object's location on the surface) bearing the detected label.

Upon occasion, the module 108 will detect an object for which label detection falls below a threshold, namely, the system is unable to recognize a label on the object in the image. Despite being unable to detect a label on the object (at least initially), the system can still acquire label information for the object, by prompting human intervention. In response to such prompting, personnel may find the label on the object and move the object so that the label becomes visible to the camera(s), thereby enabling label detection. Alternatively, human interaction with the system, through for example scanning the label with a handheld device (e.g., a short-range barcode reader, OCR scanner), voice recognition, gesture recognition, or keyboard input, can provide the label information directly, foregoing the need for the system 100 to detect the label. This human interaction may be appropriate when the label is already visible to the camera(s) but is of a type that is presently unrecognizable by the system. Other possible reasons why the system 100 may be unable to detect the label are because it is at a skewed angle with respect to the camera, damaged, or obscured by other objects.

The image with the unrecognizable label may be retained for purposes of later retraining of the DNN 114 so that the DNN will become able to recognize a previously unrecognizable label when that label is present in subsequently processed images. After the previously unrecognizable label becomes recognized, with the help of the human input, the image and associated label information are stored in an image database 126. The image database 126 may be kept in local storage 128, accessed through the central computer 124 in proximity of the module 108. In this embodiment, the central computer 124 provides access to the image database 126 for all deployed modules 108. In another embodiment, shown in phantom, the image database 126 is stored in remote storage 130, for example, in "the cloud", with which each module 108 is in communication through the server(s) 122. In addition to those initially unidentifiable images, the image database 126 also holds the initial training set of images.

The system 100 uses these stored images and labels to retrain the deep neural network 114. By retraining the deep neural network with previously unrecognizable labels, now made identifiable by human-provided label information, the neural network 114 increasingly grows "smarter". Over time, the probability of the neural network recognizing labels on objects in later captured images approaches one hundred percent.

Also, upon occasion, the module 108 will detect a label on an object but is unable to read the label. The system can still acquire label information for the object by prompting human intervention to supply such information.

Accordingly, the system 100 may include one or more special purpose processors, software, or a combination thereof as well as a computer memory for storing and/or executing one or more object and/or label detection algorithms performing processes herein. In some embodiments, the computer vision system is programmed with predetermined and configurable image data conditions that identify and capture certain types of movement. In some embodiments, the computer vision system is programmed to constantly capture and process image data from one or more sets of sensors to detect the image data conditions. In some embodiments, the computer vision system is programmed to trigger the process of identifying all objects and extracting label information from objects present in a field of view of the system if the image data conditions are fulfilled. In some embodiments, the computer vision system processes the image data with one or more object detection algorithms and label detection algorithms and generate correspondences between objects and labels identified. In some embodiments, the computer vision system executes change detection algorithms and semantic analysis to detect if any object was moved, removed, occluded and if any new objects were added in to the system.

Figure 2:
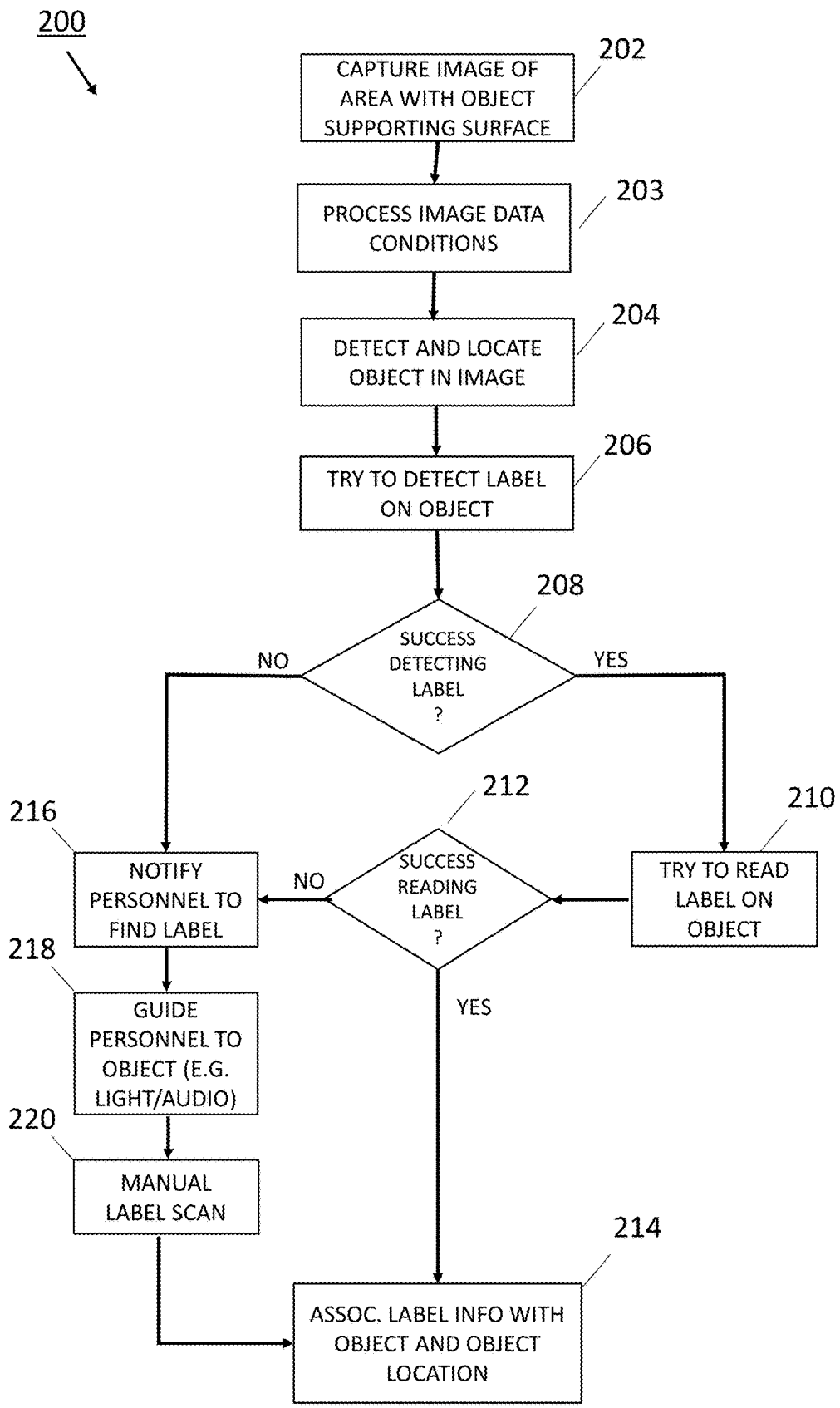
FIG. 2 shows an embodiment of a process for detecting, reading, and registering a label on an object placed on a surface.

FIG. 2 shows an embodiment of a process 200 for detecting, reading, and registering a label on an object placed on the object-supporting surface 104. At step 202, the camera 110 of one or more modules 108 captures an image of the area with the object-supporting surface 104 and passes the image to the controller 112 for processing. One or more image data conditions are processed (step 203), for example, described herein. The computer-vision module 116 of the controller processes the image to detect (step 204) an object in the image and to associate the object with a location of the object-supporting surface. As mentioned above, the operations can either be continuous or they can be "automatically" triggered if the abovementioned image data conditions using keyframes/markers are met. By setting the appropriate image data conditions (step 203), the operation of the DNN and the algorithms used for object and label detection and label reading are triggered by, for example, (1) an object falling, or (2) detecting human walking in and out, or (3) detecting movement of an automaton (moving robot) and a lot more. Personnel can perform a manual trigger of these algorithms, for example, if the system does not accurately detect motion, or the system was off and restarted and needed to be triggered. The controller attempts to identify (recognize) the detected object, passing the image to the DNN 114. The DNN 114 may be a single deep neural network that operates on an image to identify an object and detect a label on the object or multiple deep neural networks operating independently in parallel, one of which attempts to identify an object in the image while another of which attempts to detect a label in the image. The DNN 114 may be able to recognize (identify) the detected object from the image outright (because of prior training) or may use the acquisition of label information associated with the object to make a successful identification. When an object is detected in the image, the controller 112 attempts to detect (step 206) a label on the object by passing the image to the DNN 114. In other embodiments, label detection can occur before or in parallel to object detection. The controller compares the results of label detection and object recognition and makes the correspondences between the results (i.e., this detected label belongs to this object). Detecting an object without detecting a label and detecting a label without detecting an object are both error conditions that cause the system 100 to prompt human intervention; a third error condition, described below, also prompting human intervention, is being unable to read label information from a detected label.

At step 208, the controller 112 determines whether a label was successfully detected on a detected object. When label detection is successful, the controller 112 attempts (step 210) to read the label found in the image. Depending upon the capabilities of the camera(s) 110 (i.e., narrow or wide FOV lens, fixed or programmable focus, fixed or programmable zoom), the controller can use the same image (with or without pre-processing) in which the label was detected, use a region of interest (ROI) of the original image, change the focus to the specific area of the detected label (in the instance of programmable focus), change the zoom into the specific area of the detected label (in the instance of programmable zoom), or any combination thereof. For example, the controller 112 can identify a location in the image where the label is found and perform optical character recognition (OCR) upon any textual information at the label location. If the label is a barcode (or other type of visual pattern code), the controller 112 can perform image processing techniques to determine the encoded label information. As another example, if the label is a barcode, and the controller 112 can aim laser light at the location of the label (provided, for this example, the system is a laser-based system that includes a laser-based barcode scanner on a gimbal) and cause the laser-based scanner to move and read the barcode label based on reflections from the laser light.

If the controller 112 experiences difficulties reading the label in the image, for example, because the label in its entirety does not face the camera 110 straight on or the label is skewed because of the perspective of the camera to the label placement, an image from a second camera (of a second module) with a better view of the label can be acquired. In this event, the central computing system 120 may coordinate inter-module communications so the controller 112 can obtain that image from the second camera and read the label information entirely from that image or from a composite of that image from the second camera and the original image. Alternatively, the central computing system 120 can read the label information from the image captured by each of the two cameras of the two modules and combine the label information from the two readings to produce the whole label information. To facilitate the reading of the label, the controller 112 may perform any one or more of the previously mentioned operations on the image (or region of interest on the image at the label location) to facilitate, for example, character recognition (i.e., whatever the system is configured to find). The controller may also pre-process images to deskew the angle to obtain a corrected image upon which to run detection again. Knowing the perspective of the camera enables de-skewing the image so that the label information can be de-skewed to some extent, including everything on the label inclusive of barcodes, text, etc. The label and barcodes can help understand the perspective of the camera, for example, a 1D barcode is a rectangle. This barcode geometry can be used to determine the perspective of the camera and help with the de-skewing process.

At step 212, the controller determines whether the reading of the label was successful. If so, the controller associates, that is, registers (step 214) the read label information with the object and the location on the object-supporting surface assigned to the object.

If, at step 208, the attempt to detect a label on the object is unsuccessful, or, at step 214, the attempt to read the detected label is unsuccessful, the controller notifies (step 216) personnel. The controller causes the module 108 to guide (step 218) personnel to the location on the object-supporting surface or to the object at that location, to remedy the problem. The module 108 may cause the light source to shine upon the location, cause an error message to appear on the display, or play an audio message alerting personnel of the error. Whatever the form of guidance, personnel are made aware of the specific nature of the problem (i.e., no label was detected, or a label was detected but was unreadable) and is asked to remedy it. Personnel then finds the label (if previously undetected) and manually scans the label or enters the label information into the system in step 220. This label information, supplied by human intervention, is registered with the detected object (at step 214).

Figure 3A:
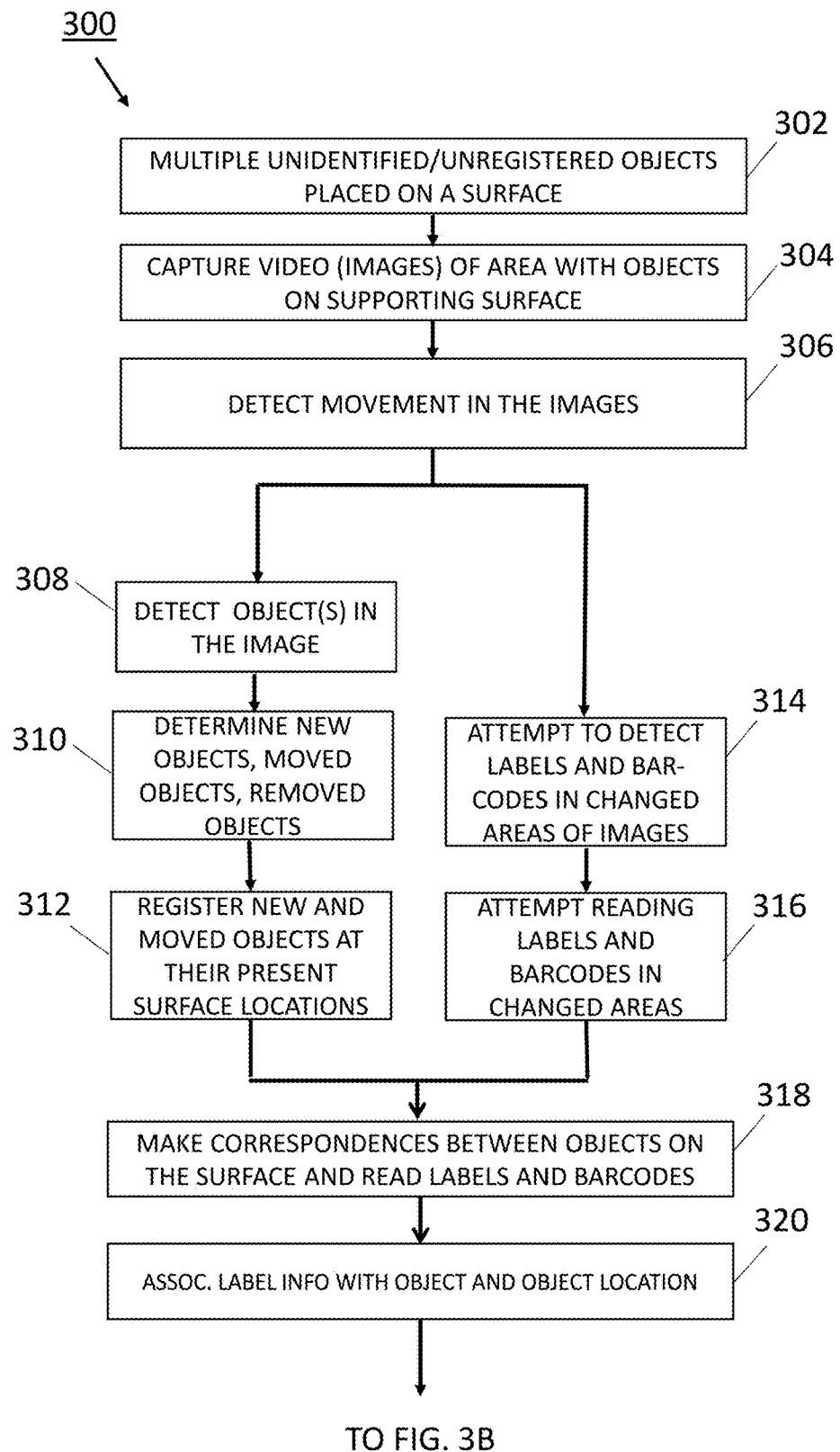
FIG. 3A and FIG. 3B show an embodiment of a process for detecting, reading, and registering labels on a plurality of unregistered objects as, or soon after, the objects are placed on a surface.
Figure 3B:
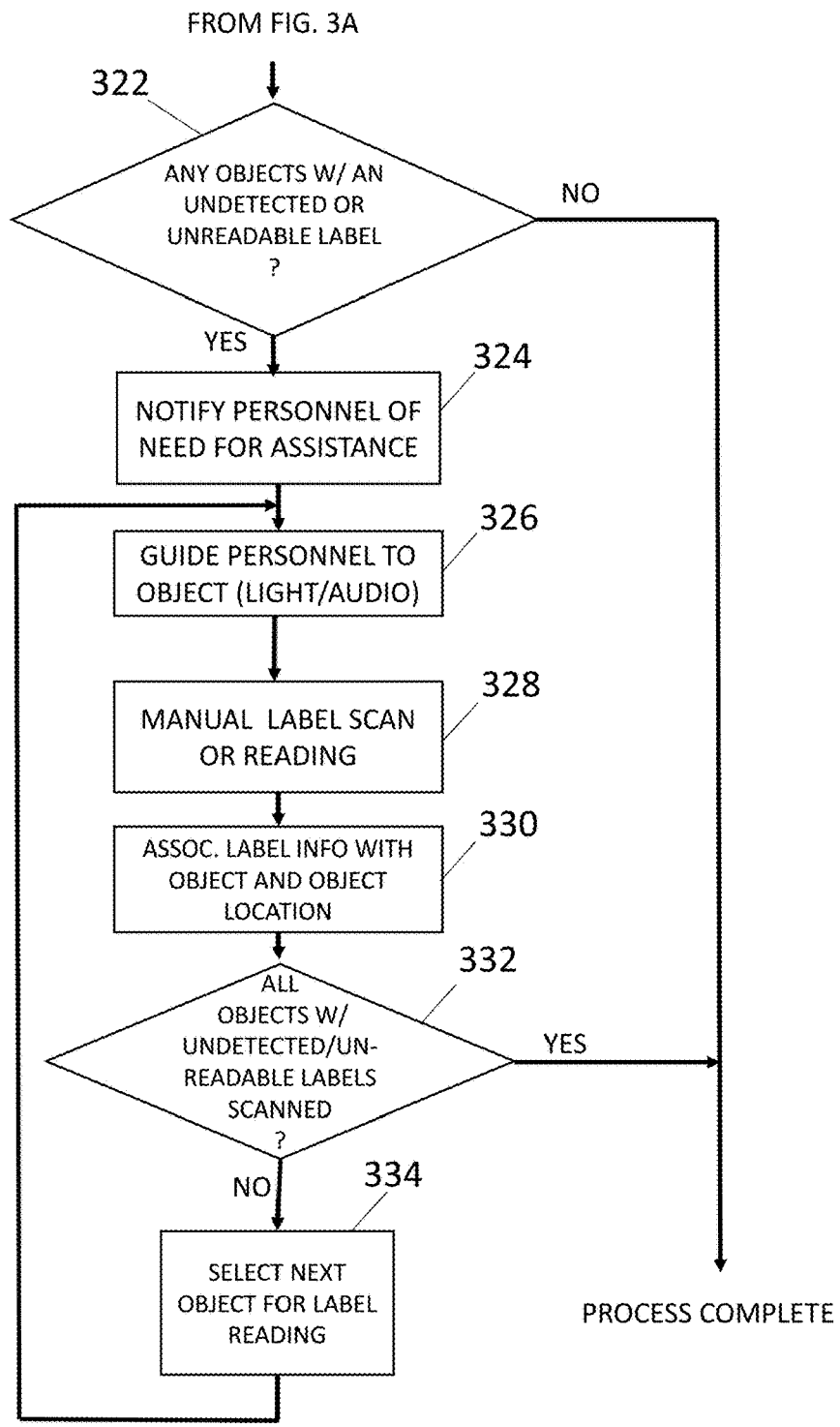

FIG. 3A and FIG. 3B show an embodiment of a process 300 for detecting, reading, and registering labels on a plurality of unregistered objects as, or soon after, the objects are placed on the object-supporting surface 104. In FIG. 3A, at step 302, personnel (or automations) unload a cart (or trolley, pallet, etc.) carrying multiple objects onto the object-supporting surface 104. The objects are unregistered in that the objects do not have preset (i.e., predetermined) locations on the surface 104, and the system 100 has not yet discovered the objects at the locations where they have been placed or associated (registered) the objects with those locations. Personnel can place the objects on the surface anywhere they choose, remove one or more previously placed objects from the surface, or move one or more previously placed objects to other locations on the surface. Preferably, personnel place the newly placed and moved objects so that their labels face the cameras, though having multiple cameras that cover all or most angles of the object-supporting surface can accommodate most, if not all, proper object placement. (An example of improper object placement would be placing the object so that the label faces down toward the surface and cannot be read automatically because a camera cannot see it.)

At step 304, the system captures images (i.e., continuous video) of the objects on the object-supporting surface 104. The images may come from a single set of sensors, which are used for both object detection and label detection or from multiple sets of sensors, wherein the images from one set are used for object detection, and the images from another set are used for label detection. The system processes the images and detects (step 306) specific movements in the images using the image data conditions. In the embodiment with two independent sets of sensors, the system can perform movement detection in images captured by one set of sensors and map those changes to the other set of sensors. In this manner, the system needs to perform the detection of movements in images for only one of the detection operations (either object detection or label detection) and uses those results for the other detection operation. In another embodiment with independent sets of sensors, the system detects movements in images for both object detection and label detection operations, as for example, the set of sensors used for label detection might have a better perspective (i.e., angles) when for looking at labels than the set of sensors used for object detection.

Based on detected movements in the images, the system detects (step 308) objects in the images and determines (step 310) the arrival of new objects, objects that were moved from one surface location to another, and objects that were removed from the surface altogether. The system registers (step 312) each new and moved object at its present location on the surface.

In parallel to the process for detecting objects on the surface, the system attempts to detect and read labels. In the areas of detected changes in those images used in step 306, the system attempts to detect (step 314) labels and barcodes. To look for such labels and barcodes, the system runs label detection and/or barcode detection algorithms. From the changed areas corresponding to detected labels and barcodes, the system attempts to read (step 316) label information. At step 318, the system makes correspondences between new objects and read labels and barcodes. The system has previously made such correspondences for moved objects as a result of previous object-label information registration; thus, moved objects do not require, although they may still be the subject of a subsequent correspondence made between object and label information. In one embodiment, this correspondence is made by comparing the areas or boundaries (i.e., pixel locations) of each object detected with the areas or boundaries of each detected label and barcode) to determine if there is a spatial overlap between the areas of a given object and a label. The comparison may require a transformation of the data if images used for object and label detection come from different sets of sensors. This correspondence operates to associate or register (step 320) the label information with the corresponding object and the surface location of that object. In cases where the label/barcode can provide additional information regarding the object type, this information is used to make correspondences. This will also be an additional verification step for the area-match based correspondence method above. For example, the barcode on a retail item may provide the information of the object type which can be electronically matched with the object detection results.

In FIG. 3B, at step 322, a determination is made whether any objects (new or moved) have undetected or unreadable labels. If not, the process is complete. If there is one or more such objects, however, personnel is notified (step 324) of the need for assistance. Since the occurrence of an unreadable label is after correspondences between labels and objects are made (step 318), and if this unreadable label is within the change area (which it should be, since only that area is processed for label reading), the unreadable label will be associated with a specific detected object. Thus, failed detection of label on an object and failed reading of a detected label on the object both lead to the same result, namely, an object with no or partial label information; thus, assistance is needed.

The system guides (step 326) personnel to the object using, for example, light guidance, audio cues, or a combination thereof. At step 328, personnel manually perform a label scan or reading using a mobile device adapted to read information from the specific type of label. In the event label scanning or reading is impractical, personnel may submit the label information through manual entry (e.g., keyboard). That label information becomes associated (i.e., registered) with the object and the object location on the supporting surface in step 330.

At step 332, a determination is made whether any detected objects (new or moved) with undetected or unreadable labels remain. If not, the process is complete. If so, the next such object is selected (step 334) for human intervention. The process of acquiring label information for detected objects continues with personnel being notified (step 324) of the need for assistance with respect to this selected object.

Figure 4A:
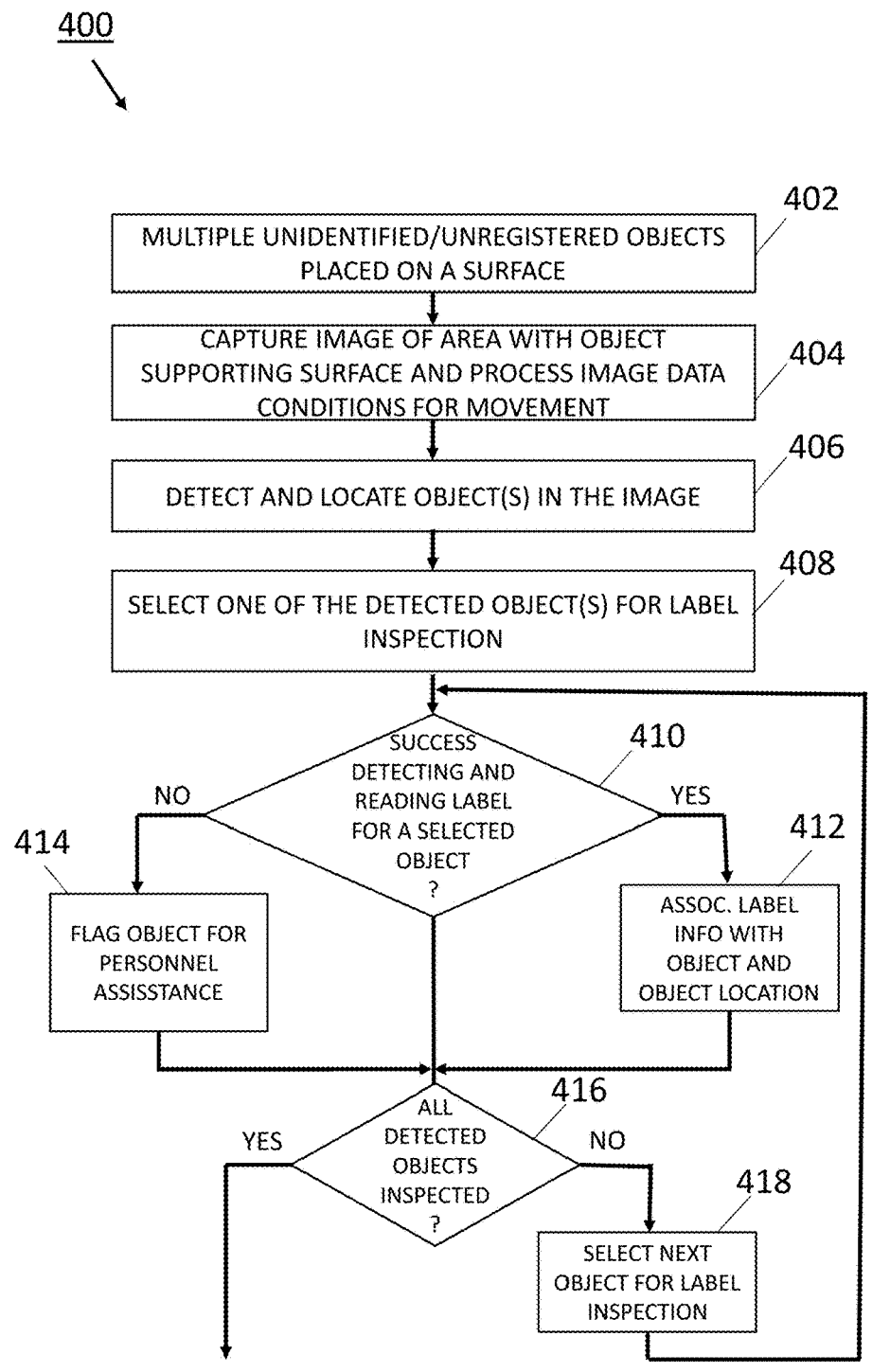
FIG. 4A and FIG. 4B show an embodiment of an alternative process for detecting, reading, and registering labels on a plurality of objects as, or soon after, the objects are placed on a surface.
Figure 4B:
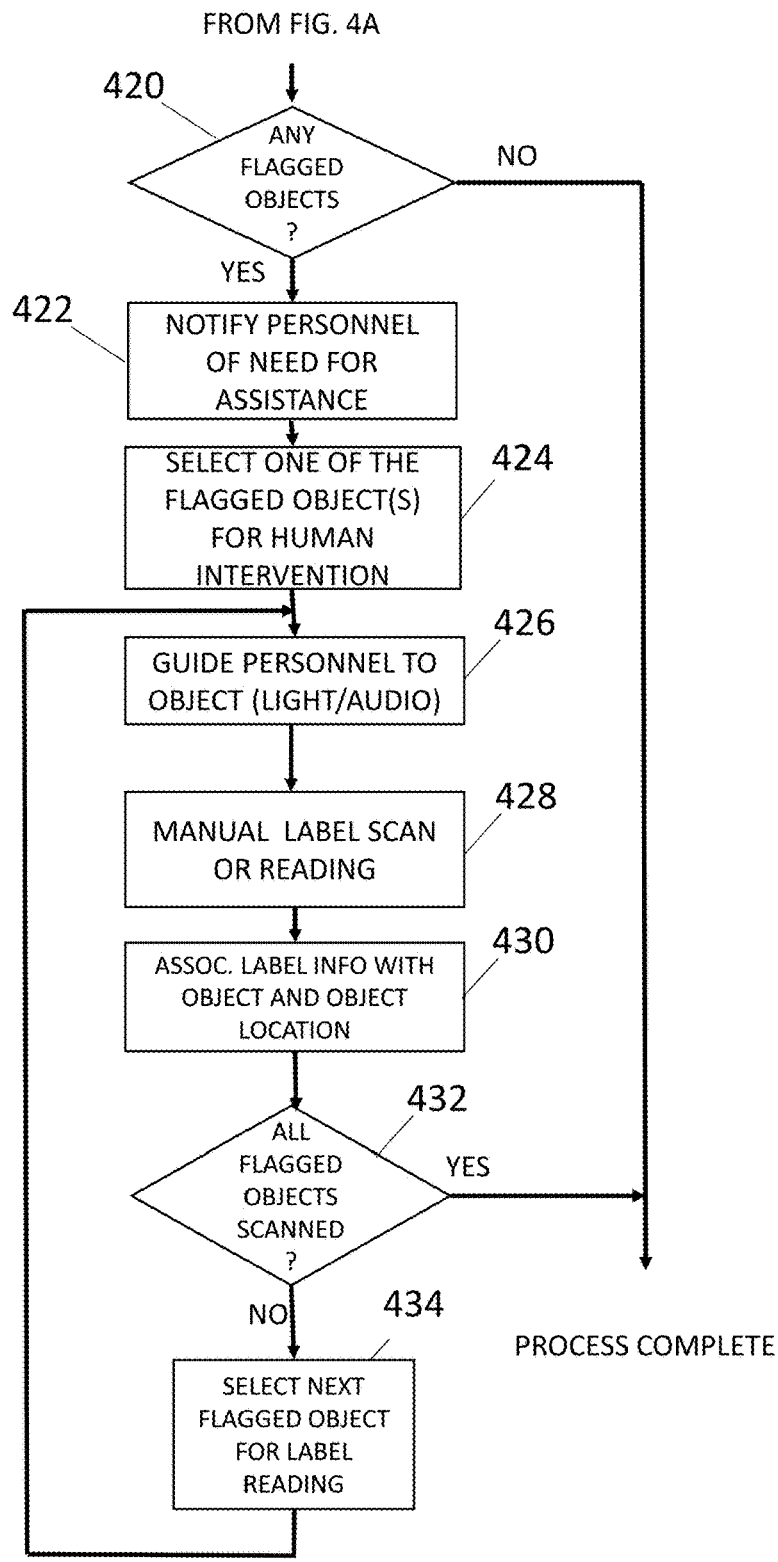

FIG. 4A and FIG. 4B show an embodiment of an alternative process 400 for detecting, reading, and registering labels on a plurality of objects as, or soon after, the objects are placed on the object-supporting surface 104. In this alternative process 400, label detection and reading follow object detection in pipeline fashion.

In FIG. 4A, at step 402, personnel (or automations) unload a cart (or trolley, pallet, etc.) carrying multiple new objects onto the object-supporting surface 104. Personnel can place the objects on the surface anywhere they choose and move objects presently on the surface to other locations on the surface or remove them permanently. Preferably, personnel place the new and moved objects so that their labels face the cameras, though having multiple cameras that cover all or most angles of the object-supporting surface can accommodate most, if not all, proper object placement. At step 404, the system captures images of the objects on the object-supporting surface 104. The system then processes the image for the image data conditions to detect movements and then proceeds to, if the image data conditions are met, detect (step 406) new, moved and removed objects in the image, and establishes (registers) their current locations on the surface 104.

For each new object detected in the image, the system selects (step 408) that object and attempts (step 410) to detect and read the label on that object. The system already possesses label information for moved objects, as a result of previous object-label information registration, and thus moved objects do not require, although they may still undergo, a label inspection. If the label detection and label reading are successful, the system associates or registers (step 412) the label information with the selected object and the location of the selected object. If the system is unable to detect a label, or detects a label but cannot read it, the selected object is flagged (step 414) as requiring subsequent human intervention. Flagging an object, as used herein, means programmatically marking or remembering the object so the object can be set aside for later attention after all detected objects have been processed for label detection and label reading. Though the operations of label detection and label reading are combined in FIG. 4A in a single step, these operations can occur independently, and an object can be flagged as requiring human intervention when label detection fails (i.e., foregoing any attempt to read a label that has not been detected).

At step 416, the system determines whether all detected objects have been inspected for a label. If not, another of the detected objects is selected (step 418) and the process returns to step 410 for detecting and reading a label on that object. If so, the process proceeds to determining (step 420, FIG. 4B) whether any detected objects were flagged. If no detected objects have been flagged, the process is complete.

If at least one detected object has been flagged, personnel is notified (step 422) of the need for assistance. The system selects (step 424) a flagged object and guides (step 426) personnel to the selected object. Such guidance may be the shining of light upon the location, displaying an error message on the display screen, or playing an audio announcement (voice message, beeping, etc.) or any combination thereof. The guidance is tailored to make personnel aware the specific nature of the problem (i.e., no label was detected, or a label was detected but was unreadable) so that personnel can remedy it. Personnel then finds the label (if previously undetected) and manually scans (step 428) the label using a handheld scanner or mobile reader or enters the label information into the system. This label information, supplied by human intervention, is registered with the detected object (at step 430). If more flagged objects remain (step 432), the system selects (step 434) the next flagged object on the list, guides (step 426) personnel to the next flagged object, so that personnel can acquire and input (step 428) the label information into the system and the system can register (step 430) the label information with that flagged object. When label information of all detected objects has been acquired and registered with those objects, the process is complete.

Figure 5:
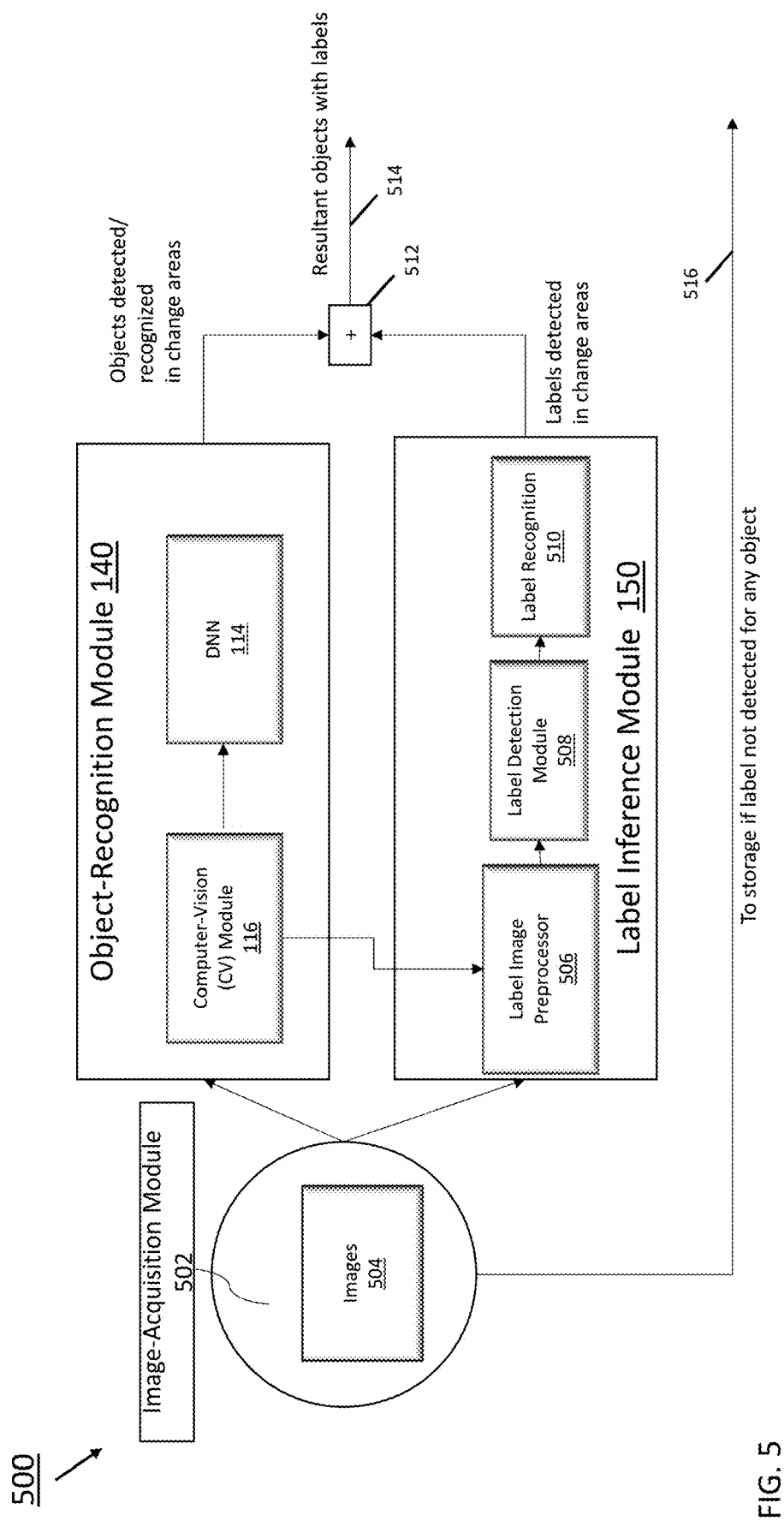
FIG. 5 shows a functional block diagram of an embodiment of the system including an image-acquisition module, an object-recognition module, and a label-inference module.

FIG. 5 shows a functional block diagram 500 of an embodiment of the system 100 including an image-acquisition module 502, the object-recognition module 140, and the label-inference module 150. The image-acquisition module 502 acquires images 504 from the sets of camera(s) 110 (FIG. 1) and supplies the images 504 as input to the object-recognition 140 and the label-inference 150 modules. Such images 504 include color images (e.g., RGB) and, optionally, depth and infrared, depending on the sensor configuration.

The object-recognition module 140 includes the computer vision module 116 and DNN(s) 114. The images 504 may pass through an image preprocessor (not shown), which may or may not modify an image before the image passes to the computer vision module 116 and DNN(s) 114. In general, the computer-vision module 116 detects changes in images, and the DNN 114 recognizes objects in the image areas where change is detected. Output from the object-recognition module 140 are objects recognized in the detected change areas of an image.

The label-inference module 150 includes a label image pre-processor 506, a label detection module 508, and a label recognition module 510. The label-inference module 150 receives an image from the computer vision module; this image focuses upon an image area of detected change.

The label image pre-processor 506 is configured to apply one or more image-editing techniques determined to enhance the ability to detect labels in the image area of detected change. The label detection module 508 employs image processing techniques to look for and find labels in the changed region. The label recognition module 510 reads label information from detected labels. The terms "recognize" and "read" for the purpose of acquiring information from detected labels are used herein interchangeably. To read label information from detected labels, the label recognition module 510 uses image-processing techniques (e.g., OCR, barcode scanning) to read the labels. Output from the label-inference module 150 are labels detected in the change areas of an image and their label information.

The label recognition module 510 passes its results (i.e., data) to the computer vision module. This data includes the location (i.e., single pixel) and the area of the detection (i.e., bounding box) for each label and barcode found and the decoded information. If necessary, this data is transformed to the object detection sensor spaces. The controller, after possessing the object and label results, makes a correspondence 512 between objects detected (or recognized) in changed areas of an image and labels detected (and read) in changed areas of the same or different image by identifying a volumetric spatial overlap between an object model (area) and a label area. The result 514 of the correspondence 514 are objects with labels. Further, such labelled objects are registered at specific locations on the support surface 104 (FIG. 1). Images 504 for which a label is not detected for an object are sent to storage. Because the label was not recognized, such images are collected for subsequent analysis and manual labeling for purposes of training the DNN 114 (i.e., used for object recognition and, in one embodiment, for label detection.)

Figure 6:
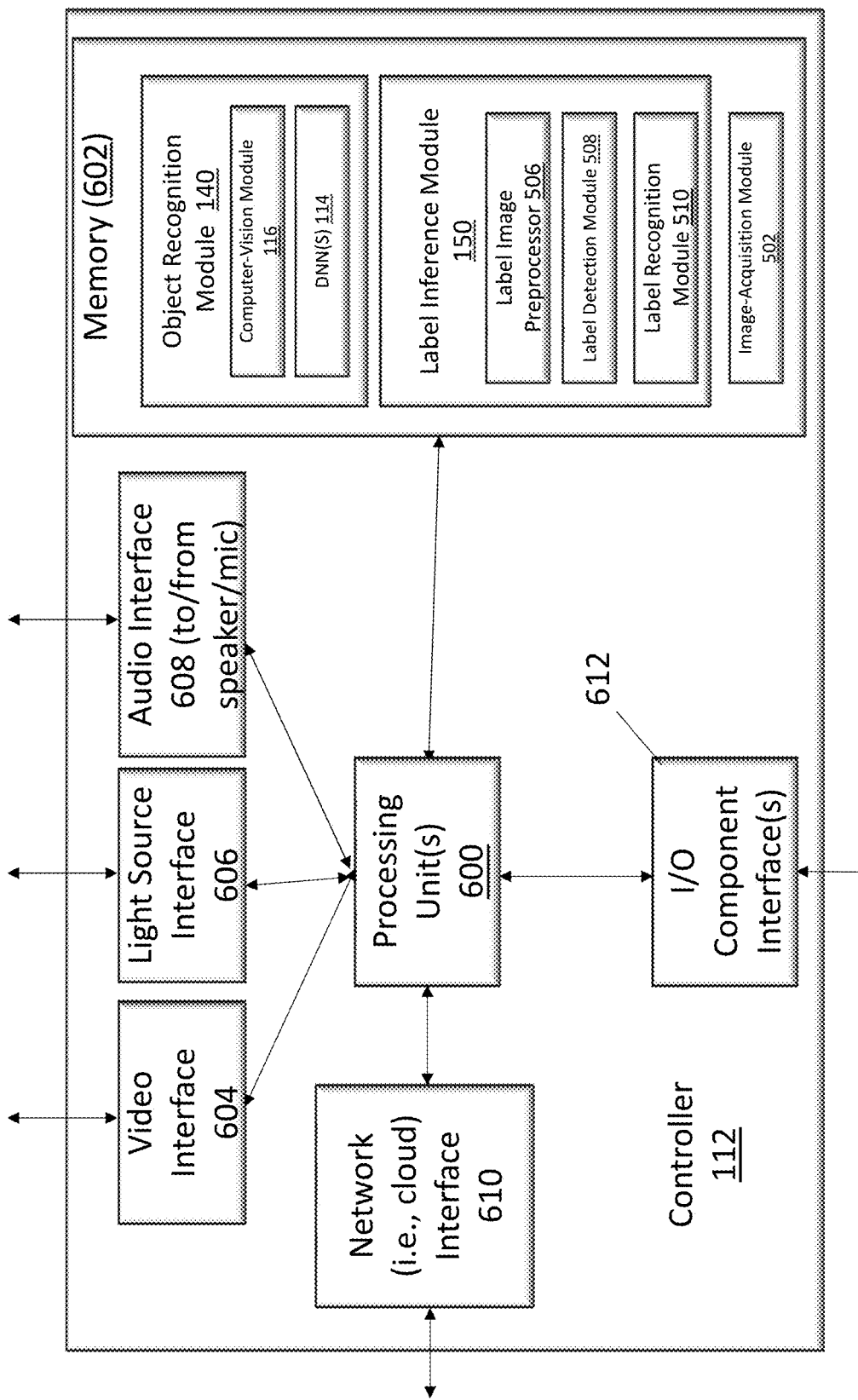
FIG. 6 show an embodiment of a controller of FIG. 1.

FIG. 6 show an embodiment of the controller 112 of FIG. 1. The controller 112 includes one or more processors 600, examples of which include, but are not limited to, image processors, central processing units, graphics processing units, each of standard or custom design. The one or more processors 600 are in communication with memory 602. In the instance of multiple processors 600, such processors may be located at different sites (e.g., one processor disposed locally (i.e., at the stationary or mobile device) and another disposed remotely (e.g., in "the cloud"). Similarly, the memory 602 can be disposed locally, remotely, or a combination thereof.

The one or more processors 600 are also in communication with a video interface 604, an optional light source interface 606, an optional audio interface 608, a network interface 610, and interfaces 612 to I/O components (e.g., the display 120 of FIG. 1). By the video interface 604, the controller 112 communicates with the camera of the module 108 (FIG. 1); by the light source interface 606, the controller 112 controls activation of the optional light source 118 (FIG. 1), and, depending upon the type of light source, the direction in which to point an emitted light beam; by the audio interface 608, the controller 112 communicates with audio devices that capture or play sound and/or audible message.

In addition to conventional software, such as an operating system and input/output routines, the memory 602 stores program code for configuring the one or more processors 600 to execute the object-recognition module 140 and the label-inference module 150. In the embodiment shown, the object-recognition module 140 includes the one or more deep neural networks (DNN) 114 and the computer-vision module 116, and the label-inference module 150 includes the label image preprocessor 506, the label detection module 508, and the label recognition module 510. The program code stored in the memory 602 also includes the image-acquisition module 502.

The program code (i.e., modules) shown in FIG. 5 are not exhaustive. The memory 602 can store other modules for the processor(s) 600 to execute, examples of such modules including, but not limited to, a user (e.g., personnel) registration module, a human-input acquisition module, an image-preprocessing module, an object-tracking module, a light/audio guidance module, a machine-learning module, which includes a DNN trainer, and a quality measurement module (QMM), which are described in the aforementioned U.S. Pub. No. US 2020-0097724-A1. Various elements or functionality of the controller 112 may reside remotely from the module 108; that is, in some embodiments, some elements or functionality of the controller 112 may not be embodied in the module 108 (FIG. 1), but operate remotely (e.g., in "the cloud").

The one or more processors 600 and memory 602 can be implemented together or individually, on a single or multiple integrated circuit (IC) devices. In addition, the program code stored in memory 602 can reside at different sites. For example, the program code for implementing the DNN(s) 114 can reside at a remote location (e.g., on the cloud) while the program code for image acquisition can reside and execute locally (i.e., on the module or mobile device).

As will be appreciated by one skilled in the art, aspects of the systems described herein may be embodied as a system, method, and computer program product. Thus, aspects of the systems described herein may be embodied in entirely hardware, in entirely software (including, but not limited to, firmware, program code, resident software, microcode), or in a combination of hardware and software. All such embodiments may generally be referred to herein as a circuit, a module, or a system. In addition, aspects of the systems described herein may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include Python, C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods described herein can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles described herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with the principles described herein is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of the principles described herein may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications, and variations would be or are apparent to those of ordinary skill in the applicable arts. References to "one embodiment" or "an embodiment" or "another embodiment" means that a specific feature, structure or characteristic described in connection with the embodiment is included in at least one embodiment described herein. Each reference to a specific embodiment within the specification does not necessarily refer to the same embodiment. The features illustrated or described in connection with one exemplary embodiment may be combined with the features of other embodiments. Accordingly, it is intended to embrace all such alternatives, modifications, equivalents, and variations that are within the spirit and scope of the principles described herein.

What is claimed is:

1. A computer vision system for automatic identification, tracking and management of inventory and/or assets, wherein:
    the computer vision system is programmed with predetermined and configurable image data conditions that identify and capture certain types of movement;
    the computer vision system is programmed to constantly capture and process image data from one or more sets of sensors to detect the image data conditions;
    the computer vision system is programmed to trigger the process of identifying all objects and extracting label information from objects present in a field of view of the system if the image data conditions are fulfilled;
    the computer vision system processes the image data with one or more object detection algorithms and label detection algorithms and generate correspondences between objects and labels identified; and
    the computer vision system running change detection algorithms and semantic analysis to detect if any object was moved, removed, occluded and if any new objects were added to the system.

2. The computer vision system of claim 1, wherein the image data conditions include a set of rules for capturing certain types of physical movements.

3. The computer vision system of claim 1, wherein the process being triggered comprises:
    (a) capturing images of a support surface;
    (b) detecting one or more objects of the objects in the captured images;
    (c) detecting one or more labels in the captured images;
    (d) automatically reading label information from each detected label; and
    (e) registering each detected label and the label information read from that detected label with a corresponding object of the one or more detected objects,
        wherein the triggered process is automatically performed by a key or marker in the captured images.

4. The computer vision system of claim 3, wherein the system associates each detected object in the field of view with a location on the support surface.

5. The computer vision system of claim 3, wherein the system notifies personnel if a label is not detected or read for any of the one or more detected objects.

6. The computer vision system of claim 3, wherein reading label information from a given detected label comprises performing optical character recognition on the detected label.

7. The computer vision system of claim 3, wherein the computer vision system is programmed to transform an image of the detected label to appear in an orientation that facilitates optical character recognition.

8. The computer vision system of claim 3, wherein the detected label is a barcode; and reading label information from a given detected label comprises reading the barcode.

9. The computer vision system of claim 3, wherein the barcode includes a geometry used to determine a perspective of the camera with assistance of a de-skewing process.

10. The computer vision system of claim 3, wherein the computer vision system is programmed to guide personnel to a given object on the support surface when a label is not detected on the given object or a label detected on the given object could not be automatically read.

11. The computer vision system of claim 10, wherein the computer vision system is programmed to permit scanning of, by personnel using a mobile device, the label on the given object when the label is not detected on the given object or the label is detected on the given object but could not be read automatically.

12. The computer vision system of claim 11, further comprising stabilizing the scanning of the label on the given object with an inertial sensor of the mobile device.

13. The computer vision system of claim 3, wherein information obtained from the label is processed to obtain the type of the object, and the system further comprises detecting what the objects are from the object detection results; and provide correspondences or provide an additional verification for making the correspondences.

14. The computer vision system of claim 3, wherein the key or marker is one or more of (1) an amount or location of observed changes, (2) changes detected in object locations, new and/or removed objects, (3) changes detected in a location of existing labels or new labels, and (4) a detection of a specific type of person, automaton, or object wherein for new objects, the system further comprises generating a correspondence between the new objects and labels by processing location and type data of the new objects and labels.

15. A method for executing a computer vision system for automatic identification, tracking and management of inventory and/or assets, comprising:
    programming a special-purpose computer with predetermined and configurable image data conditions that identify and capture certain types of movement;
    programming a special-purpose computer to constantly capture and process image data from one or more sets of sensors to detect the image data conditions;
    programming a special-purpose computer to trigger the process of identifying all objects and extracting label information from objects present in a field of view of the system if the image data conditions are fulfilled;
    programming a special-purpose computer to process the image data with one or more object detection algorithms and label detection algorithms and generate correspondences between objects and labels identified; and
    programming a special-purpose computer to execute change detection algorithms and semantic analysis to detect if any object was moved, removed, occluded and if any new objects were added to the system.

\* \* \* \* \*